R. M. FIALA.
ANTISKID OR TRACTION CHAIN FOR WHEELS.
APPLICATION FILED NOV. 1, 1921.

1,410,396.

Patented Mar. 21, 1922.

Inventor
R. M. Fiala
By
Attorney

UNITED STATES PATENT OFFICE.

RUDOLPH M. FIALA, OF HOWELL, NEBRASKA.

ANTISKID OR TRACTION CHAIN FOR WHEELS.

1,410,396.　　　　Specification of Letters Patent.　　Patented Mar. 21, 1922.

Application filed November 1, 1921. Serial No. 512,044.

*To all whom it may concern:*

Be it known that RUDOLPH M. FIALA, a citizen of the United States of America, residing at Howell, in the county of Colfax and State of Nebraska, has invented new and useful Improvements in Antiskid or Traction Chains for Wheels, of which the following is a specification.

The object of the invention is to provide a simple and efficient tread chain for the wheels of automobiles, trucks and like vehicles having pneumatic or cushion tires, as a protection against skidding and as a means of increasing the tractive effect thereof; and more particularly to provide a device of this type which shall be applicable to the wheel with the least inconvenience to the operator and of which the holding means shall be such as to provide against accidental displacement; and with arrangement or displacement; and with these objects in view the invention consists in a construction and combination of parts of which a preferred embodiment is shown in the accompanying drawings, wherein:—

Figure 1:
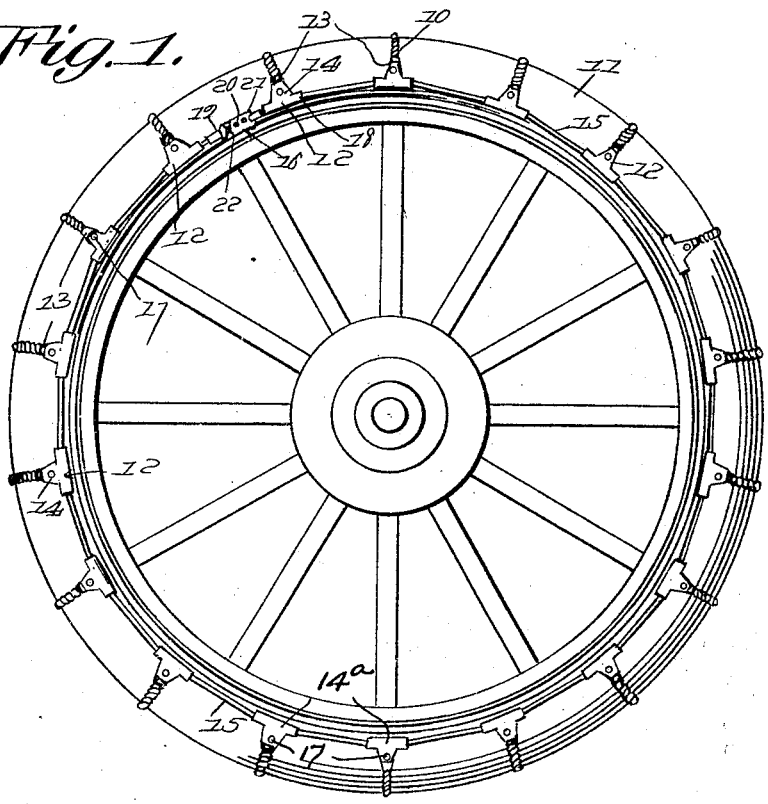
Figure 1 is a view of an anti-skid chain embodying the invention applied in the operative position to a vehicle wheel.
Figure 2:
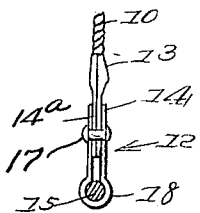
Figure 2 is a detail side view of one of the coupling members.
Figure 3:
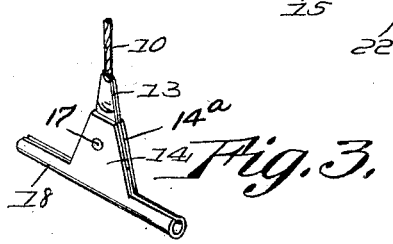
Figure 3 is a detail perspective view of the same.
Figure 4:
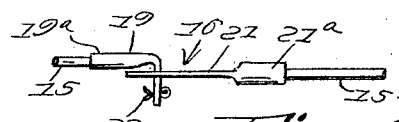
Figure 4 is a detail view of the fastening device.

The chain consists essentially of a plurality of spaced tread members arranged in transverse spanning relation with the tire 11 and consisting in the construction illustrated of short chains terminally provided with coupling members 12 shown in detail in Figures 2 and 3 and consisting of a stem 13 and a clamp 14, and extending through the clamps carried by the tread members at each side of the plane of the wheel is a continuous retaining member or runner 15 of wire or its equivalent of which the extremities are connected by a fastening device 16 shown in detail in Figure 4.

The stem 13 consists of a plurality of catching members bulged at one end to form a socket for the reception of the end of the tread chain and held in place by the wings 14ª of the clamp which are transversely secured by a rivet 17 or its equivalent, the looped end of the clamp having a tubular seat 18 for the reception of the runner or retaining member 15. In practice the clamp is preferably constructed of a blank of sheet metal rolled or folded as indicated in Figure 3 so that the tubular seat 18 thereof serves as a guide for the retainer or runner.

In the illustrated embodiment of the invention the fastening device consists of a hook member 19 attached to one end of the runner or retainer for engagement selectively with openings 20 in a catch member 21, said hook and catch being fastened by means of rolled sockets 19ª and 21ª to the opposing extremities of said runner, and as a means of security the hook may be locked in the selected opening of the catch by a cotter pin 22.

Obviously any desired number of transverse or tread elements may be employed in connection with an anti-skid chain of the type indicated, to suit the service for which it is designed and the character of the wheel in connection with which it is adapted to be used, and the relative arrangement or spacing of the tread elements on the retainers or runners arranged at opposite sides of the wheel may be varied by the sliding of the tubular portions of the coupling members on the wire constituting said retainers or runners, it being obvious that when the retainer is tightened by the fastening of the ends thereof, the portions thereof between two adjacent couplings being arranged in the position of a chord or a circle will hold the couplings and therefore the tread chains against creeping movement or relative displacement. Or obviously, if preferred, the clamps may be tightened sufficiently to lock the tread elements in fixed relation, longitudinally with the retainers or runners.

Having described the invention, what is claimed as new and useful is;—

An anti-skid chain having spaced transverse tread members adapted for arrangement in spanning relation with the tread of a tire, stems carried at the extremities of the tread members and consisting each of a pair of complemental members bulged at one end to form a socket engaging the ends of the tread member, a clamp provided with wings disposed on opposite sides of the stem and riveted thereto and having looped ends constituting tubular seats, and runners for disposition at the sides of the tire and engaging in said tubular seats in the manner and for the purpose specified.

In testimony whereof he affixes his signature.

RUDOLPH M. FIALA.